US012650086B1

(12) United States Patent
de St. Amatus et al.

(10) Patent No.: US 12,650,086 B1
(45) Date of Patent: Jun. 9, 2026

(54) DEVICE FOR CONVERSION OF KINETIC AND THERMAL ENERGIES OF GAS FLOWS TO WORK

(71) Applicants: Benedict de St. Amatus, Forest Glen (AU); Alexander de St. Amatus, Forest Glen (AU)

(72) Inventors: Benedict de St. Amatus, Forest Glen (AU); Alexander de St. Amatus, Forest Glen (AU)

( * ) Notice: Subject to any disclaimer, the term of this patent is extended or adjusted under 35 U.S.C. 154(b) by 0 days.

(21) Appl. No.: 19/195,430

(22) Filed: Apr. 30, 2025

(51) Int. Cl.
*F03D 1/02* (2006.01)
*F01D 21/00* (2006.01)
*F01D 25/30* (2006.01)

(52) U.S. Cl.
CPC ......... *F01D 25/305* (2013.01); *F01D 21/003* (2013.01); *F05D 2260/212* (2013.01); *F05D 2270/301* (2013.01); *F05D 2270/303* (2013.01)

(58) Field of Classification Search
CPC ... F03D 1/02; F03D 1/025; F03D 1/04; F03D 1/041; F03D 1/042; F03D 1/044; F03D 1/051; F03D 1/053; F03D 7/00; F03D 9/00; F03D 9/007; F03D 9/008; F03D 9/14; F03D 9/18; F03D 9/28; F03D 9/35; F03D 9/37; F03D 9/39; F03D 80/60; F03D 80/601; F03D 9/41; F03D 17/018; F03D 17/009; F03D 17/022; F03D 17/026; F01D 25/305; F01D 21/003; F05D 2260/212; F05D 2270/301; F05D 2270/3011; F05D 2270/3013; F05D 2270/3015; F05D 2270/303
See application file for complete search history.

(56) References Cited

U.S. PATENT DOCUMENTS 4,801,811 A * 1/1989 Assaf ........................ F03D 9/25 290/55
4,878,349 A * 11/1989 Czaja ........................ F03G 7/04 60/641.14
5,174,724 A * 12/1992 Ammons ................ F03D 3/062 290/55

(Continued)

FOREIGN PATENT DOCUMENTS

WO WO-2007118282 A1 * 10/2007 ............ F22B 1/1853

OTHER PUBLICATIONS

Volker, Dietz, "Power Plant or Energy Transducer . . . " EPO, DE 102012017707A1 Mar. 13, 2014 (Year: 2014).*

*Primary Examiner* — Nathaniel E Wiehe
*Assistant Examiner* — Joshua R Beebe

(57) ABSTRACT

An energy conversion device transforms kinetic and thermal energies of gas flows into usable work. It features a duct with an inlet and outlet for the gas flow and a cascade of at least two turbines located in distinct zones of the duct. A post-turbine gas cooling system, associated with the first turbine, includes an injector of evaporating liquid regulated by a controller using real-time data from pressure and temperature gauges. The first turbine's performance is enhanced by pressure and temperature differentials created by the cooling system. The second turbine prevents ambient air intrusion and further converts residual kinetic energy. Both turbines can be coupled either to electric generators or to mechanical devices or both for converting the turbines work output either to electricity or to mechanical work or to both.

3 Claims, 1 Drawing Sheet

(56) References Cited

U.S. PATENT DOCUMENTS

| | | | | |
|---|---|---|---|---|
| 7,821,151 | B2 * | 10/2010 | Le | F03G 6/045<br>290/43 |
| 8,727,698 | B1 * | 5/2014 | Pickett | F03D 9/25<br>415/909 |
| 2013/0285378 | A1 * | 10/2013 | Carmein | F03D 7/00<br>290/44 |

* cited by examiner

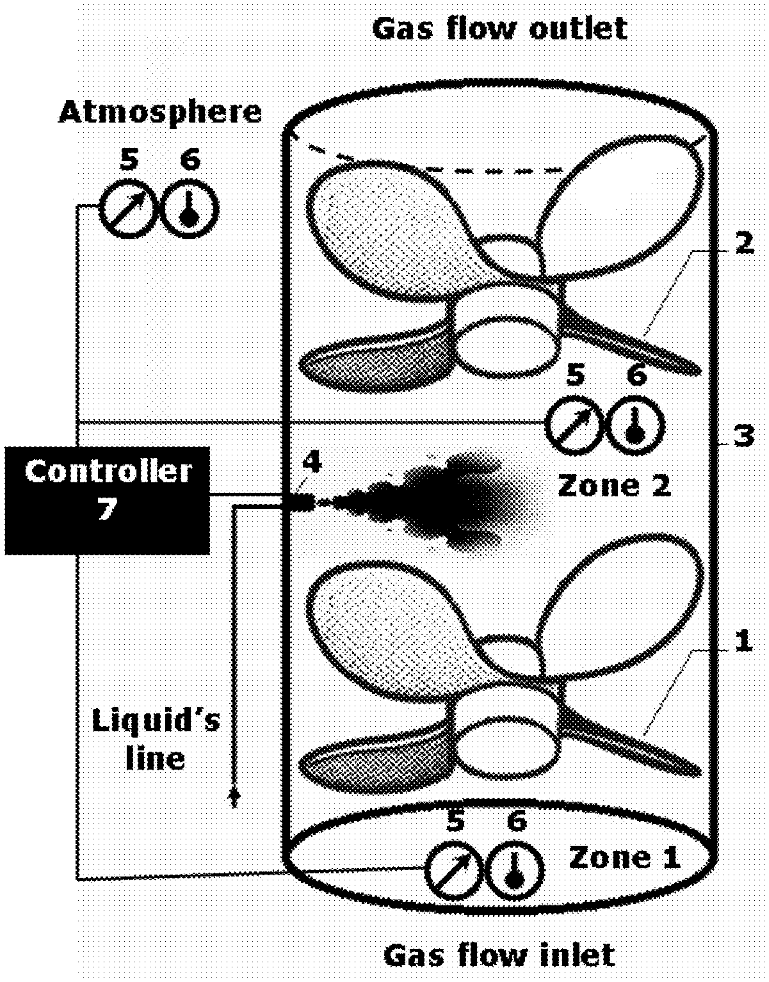
Gas flow outlet
Atmosphere
5
6
2
5
6
3
Controller
7
4
Zone 2
1
Liquid's
line
5
6
Zone 1
Gas flow inlet

DEVICE FOR CONVERSION OF KINETIC AND THERMAL ENERGIES OF GAS FLOWS TO WORK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates generally to energy conversion systems. More specifically, it pertains to the field of systems for conversion of kinetic and thermal energies of gases into usable work. The invention has applications in renewable power generation, waste heat utilisation, and other areas where the conversion of kinetic and thermal energies of gases into mechanical or electrical work, or both, is desired.

DESCRIPTION OF RELATED ART

The reference in this specification to any prior publication (or information derived from it), or to any matter which is known, is not, and should not be taken as an acknowledgment or admission or any form of suggestion, that the prior publication (or information derived from it) or known matter forms part of the common general knowledge in the field of endeavour, to which this specification relates.

Traditional energy conversion systems often involve the use of turbines to convert the kinetic energy of gases into mechanical work. These systems typically include a turbine through which gas is passed and energy is extracted. For example, wind turbines are widely used to convert the kinetic energy of wind into electrical energy. They consist of rotor blades that capture the wind's kinetic energy, which is then converted into mechanical energy to drive a generator.

One significant disadvantage of wind turbines is their inability to capture the thermal energy of the gas flow, which leads to a substantial amount of wasted energy. This limitation reduces the overall efficiency of the system and increases operational costs due to the underutilisation of available energy resources. Given this limitation, there is a need for an improved energy conversion system that maximises the extraction of usable work from both the kinetic and thermal energies of gases.

OBJECT OF THE INVENTION

The object of the present invention is to provide a device for conversion of kinetic and thermal energies of gases to work that overcomes the drawbacks of the prior art. Specifically, the invention aims to:

- Maximise the extraction of usable work from both the kinetic and thermal energies of the gases.

- Provide control over the energy conversion process through real-time monitoring and adjustment of operational parameters.
- Offer a versatile solution that can be adapted to various industrial, waste heat management, and renewable power generation applications.
- Reduce operational costs and environmental impact by improving the overall efficiency of the energy conversion process.

Other objects and advantages of the present invention will become apparent from the following description, taken in connection with the accompanying drawings, wherein, by way of illustration and example, embodiments of the present invention are disclosed.

SUMMARY OF THE INVENTION

According to the present invention, the device for the conversion of kinetic and thermal energies of gases to work, comprises a duct having an inlet for gas flow entry and an outlet for gas flow exit to the ambient atmosphere; a cascade of at least a first turbine and a second turbine positioned within the duct, wherein the first turbine is positioned in a first zone located between the duct inlet and said first turbine, and the second turbine is positioned in a second zone located between the first turbine and the duct outlet; a post-turbine gas cooling system associated with the first turbine, comprising at least one injector of evaporating liquid positioned at or near the outlet of the first turbine, and at least three pressure gauges and at least three temperature gauges distributed in the first zone, the second zone, and outside the duct, and a controller for controlling the injector based on the pressure and temperature data from the gauges.

At least one pressure gauge and at least one temperature gauge are positioned in each of the first and second zones for measuring respective pressures and temperatures and transferring real-time data to the controller. At least one pressure gauge and at least one temperature gauge are positioned outside the duct for measuring the ambient atmospheric pressure and temperature and transferring real-time data to the controller.

The injector is connected to a liquid's line comprising pipes, at least one reservoir for the liquid, at least one filter and at least one pump. The injector injects a mist of evaporating liquid into the gas flow post the first turbine, inducing rapid cooling and a consequent pressure drop at or near the outlet of the first turbine, wherein the controller uses an algorithm configured to regulate the injection rate of the evaporating liquid based on the real-time pressure and temperature data to maintain preferred pressure and temperature differentials between the first and second zones, and between the second zone and the ambient atmosphere.

The first turbine converts a fraction of the kinetic energy of the gas flow entering the duct into work, with its conversion rate enhanced by the pressure and temperature differentials created by the gas flow's cooling system between the turbine's inlet and outlet. The second turbine is used to prevent ambient air intrusion into the second zone and to further convert a fraction of the residual kinetic energy of the gas flow in the second zone to work. The work produced by the device is the cumulative work of the first and second turbines.

The first and the second turbines are coupled either to electric generators or to mechanical devices or both for converting the turbines work output either to electricity or to mechanical work or to both.

BRIEF DESCRIPTION OF THE DRAWING

By way of illustration only, an embodiment of the invention is described more fully hereinafter with reference to the accompanying drawing, in which FIG. 1 shows an embodiment of a device for the conversion of kinetic and thermal energies of gases to work.

DETAILED DESCRIPTION OF THE INVENTION

The embodiment of the device for the conversion of kinetic and thermal energies of gases to work is shown with references to FIG. 1.

FIG. 1 shows the device for the conversion of kinetic and thermal energies of gases to work, wherein said device comprises at least one cascade of turbines. Said cascade comprises at least of two turbines-Turbine 1 and Turbine 2, which are positioned inside a Duct 3. Duct 3 has an inlet for gas flow entry and an outlet for gas flow exit to the ambient atmosphere. Duct 3 is zoned in at least two zones: Zone 1, which is located between the inlet of Duct 3 and Turbine 1 and Zone 2, which is located between Turbine 1 and Turbine 2. Turbine 2 is located at or near the outlet of Duct 3.

Alternative embodiments of said device may comprise multiple cascades of turbines and more than two turbines in a cascade.

Turbine 1 converts a fraction of the gas flow's kinetic energy into work, with its performance enhanced by the pressure and temperature differentials between Zones 1 and 2 created by a post-turbine gas cooling system. Turbine 2 is used to prevent ambient air intrusion into Zone 2 and to further convert a fraction of the residual kinetic energy of the gas flow in said zone to work.

The work produced by the device is the cumulative work of Turbines 1 and 2.

Said post-turbine gas cooling system comprises at least one Injector 4 of an evaporating liquid into the gas flow, at least three Pressure Gauges 5, at least three Temperature Gauges 6, and a mechanical or a digital Controller 7 that controls the Injector 4.

Injector 4 is positioned at or near the outlet of Turbine 1 (the pipes and the reservoir and the filter and the pump of the liquid's line are not shown in the FIGURE).

At least one Pressure Gauge 5 and at least one Temperature Gauge 6 are located in Zone 1, measuring the pressure and the temperature in said zone and transferring the real-time data to the Controller 7.

At least one Pressure Gauge 5 and at least one Temperature Gauge 6 are located in Zone 2, measuring the pressure and the temperature in said zone and transferring the real-time data to the Controller 7.

At least one Pressure Gauge 5 and at least one Temperature Gauge 6 are located outside the Duct 3, measuring the pressure and the temperature of the ambient atmosphere and transferring the real-time data to the Controller 7.

Injector(s) 4 inject(s) mist of evaporating liquid into the gas flow. The mist of evaporating liquid mixes with the gas flow and evaporates. The evaporation of the liquid rapidly cools the gas flow, which creates a pressure drop at or near the outlet of Turbine 1. The pressure difference that is created between Zones 1 and 2 of the Duct 3 results into a partial utilisation of the thermal energy of the gas flow to work.

Controller 7 receives pressure and temperature real-time data from the Pressure Gauges 5 and the Temperature Gauges 6 for Zones 1 and 2 of the Duct 3, and for the ambient atmosphere. Controller 7 uses an algorithm to optimise the injection rate of the evaporating liquid based on real-time pressure and temperature data. Based on this data, Controller 7 commands Injector(s) 4 to inject an amount of the evaporating liquid at a rate that is sufficient to create pressure and temperature drops between Zones 1 and 2, and between Zone 2 and the ambient atmosphere, wherein the pressure and the temperature of the gas flow in Zone 1 is the higher than the pressure and the temperature of the gas flow in Zone 2, and the pressure and the temperature of the gas flow in Zone 2 is higher than the pressure and the temperature of the ambient atmosphere.

Turbines 1 and 2 are coupled either to electric generators or to mechanical devices or both for converting the turbines work output either to electricity or to mechanical work or to both.

The invention claimed is:

1. A device for conversion of kinetic and thermal energies of gas flows to work, comprising:

(a) a duct having an inlet for gas flow entry and an outlet for gas flow exit to ambient atmosphere;

(b) a first turbine positioned within the duct such that a first zone is located between the duct inlet and the first turbine;

(c) a second turbine positioned within the duct such that a second zone is located between the first turbine and the second turbine, the second turbine being arranged downstream of the first turbine and upstream of the duct outlet;

(d) at least one injector positioned in the second zone downstream of the first turbine and upstream of the second turbine, the injector being configured to inject a mist of evaporating liquid into the gas flow after the gas flow has passed through the first turbine;

(e) a liquid line connected to the injector and comprising pipes, at least one reservoir for the liquid, at least one filter, and at least one pump;

(f) a first pair of gauges positioned in the first zone, the first pair comprising a pressure gauge and a temperature gauge for measuring local pressure and temperature in the first zone;

(g) a second pair of gauges positioned in the second zone, the second pair comprising a pressure gauge and a temperature gauge for measuring local pressure and temperature in the second zone;

(h) a third pair of gauges positioned outside the duct, the third pair comprising a pressure gauge and a temperature gauge for measuring ambient atmospheric pressure and temperature; and (i) a controller configured to receive real-time pressure and temperature data from the first pair, the second pair, and the third pair and to regulate an injection rate of the evaporating liquid through the injector based on said real-time pressure and temperature data;

wherein the injector injects a mist of evaporating liquid into the gas flow in the second zone after passage through the first turbine, evaporation of the liquid rapidly cooling the gas flow and causing a pressure drop from the first zone to the second zone at or near an outlet side of the first turbine, and the controller maintaining pressure and temperature in the second zone above ambient atmospheric pressure and temperature.

2. The device of claim 1, wherein the second turbine is positioned at or near the duct outlet and is configured to oppose ingress of ambient air from the duct outlet into the second zone and to convert a fraction of residual kinetic energy of the gas flow into work.

3. The device of claim 1, wherein the controller uses an algorithm configured to command the injector to inject the evaporating liquid at a rate sufficient to maintain the pressure and temperature relationships between the first zone, the second zone, and the ambient atmosphere.

* * * * *